United States Patent [19]

Sample

[11] Patent Number: 5,101,793
[45] Date of Patent: Apr. 7, 1992

[54] MANUALLY ADJUSTABLE OVERRIDE FOR FUEL INJECTION REGULATORS

[76] Inventor: Larry A. Sample, 6011 Beaudry, Houston, Tex. 77035

[21] Appl. No.: 606,529

[22] Filed: Oct. 30, 1990

[51] Int. Cl.$^5$ ............................................. F02M 55/02
[52] U.S. Cl. ..................................... 123/463; 123/382
[58] Field of Search .................. 123/463, 382, 383, 467

[56] References Cited

U.S. PATENT DOCUMENTS

| | | | |
|---|---|---|---|
| 2,944,537 | 7/1960 | Stroh | 123/463 |
| 2,995,125 | 8/1961 | Powell | 123/463 |
| 3,395,682 | 8/1968 | Jackson | 123/463 |
| 3,416,504 | 12/1968 | Jackson | 123/463 |
| 3,431,900 | 3/1969 | Jackson | 123/463 |
| 4,441,472 | 4/1984 | Knorreck | 123/382 |
| 4,543,935 | 10/1985 | Tuckey | 123/463 |
| 4,658,784 | 4/1987 | Augustin | 123/383 |
| 4,727,839 | 3/1988 | Bruhman | 123/382 |
| 4,903,721 | 2/1990 | Maier | 123/463 |

FOREIGN PATENT DOCUMENTS 2949988  7/1980  Fed. Rep. of Germany ...... 123/463

*Primary Examiner*—Carl Stuart Miller
*Attorney, Agent, or Firm*—Kenneth A. Roddy

[57] ABSTRACT

A manually adjustable override apparatus is connected to an existing fuel pressure regulator to alter the fuel-to-air mixture fed to fuel injectors. A T-shaped member has a lower end adapted to be connected on the vacuum hose fitting of the regulator and has an outwardly extending hose fitting. A headed plunger slidably contained in the longitudinal bore of the T-shaped member has an elongate lower end extending outwardly from the bottom of the T-shaped member and through the hose fitting of the regulator to engage the top of the diaphragm in the regulator. Vacuum communicates around the plunger between the interior of the T-shaped member and the vacuum chamber of the regulator. An adjustment screw in the top end of the T-shaped member engages a small piston slidably and sealably contained in the longitudinal bore. A compression spring is biased between the piston and the head of the plunger. The vacuum hose is removed from the regulator and the override device is installed on the existing regulator. The vacuum hose is re-installed on the hose fitting of the override device. When the adjustment scre is backed off, the diaphragm operates under pressure of the existing factory installed spring in the conventional manner, and when the adjustment screw is screwed in, the plunger is resiliently pressed against the diaphragm under the increased spring pressure of the secondary override spring to increase the pressure on the diaphragm and vary the fuel pressure resulting in a variable fuel-to-air ratio.

16 Claims, 1 Drawing Sheet

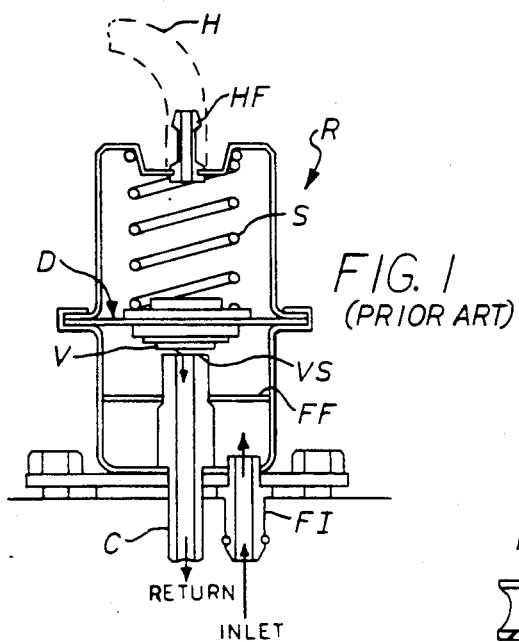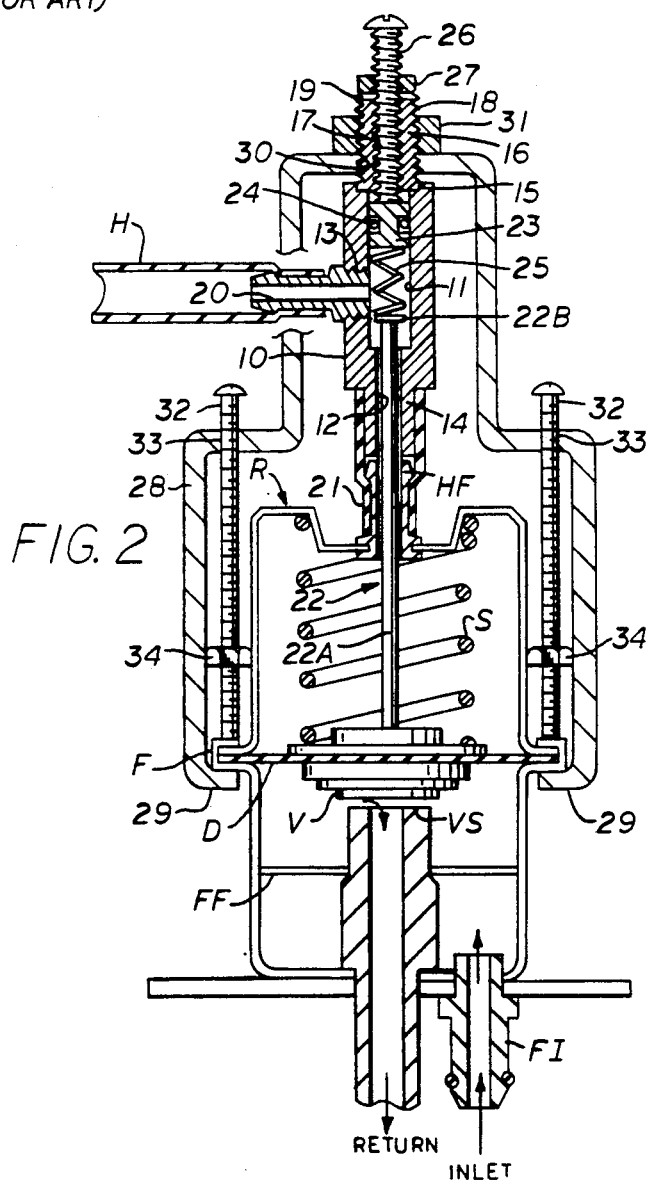

MANUALLY ADJUSTABLE OVERRIDE FOR FUEL INJECTION REGULATORS

BACKGROUND OF THE INVENTION

1. Field of the Invention

This invention relates generally to improvements to fuel pressure regulators for fuel injection engines, and more particularly to an apparatus which is installed on a conventional fuel pressure regulator and allows the fuel-to-air ratio to be manually adjusted.

2. Brief Description of the Prior Art

Fuel injection engines are provided with a fuel pressure regulator which is attached to the fuel supply manifold assembly downstream of the fuel injectors and regulates the fuel pressure supplied to the fuel injectors The pressure regulator is a diaphragm operated relief valve in which one side of the diaphragm senses fuel pressure and the other side is subjected to intake manifold vacuum. The nominal fuel pressure is established by a spring pre-load applied to the diaphragm. Balancing one side of the diaphragm with manifold pressure maintains a constant fuel pressure drop across the injectors. Fuel in excess of that used by the engine, is by-passed through the regulator and returns to the fuel tank.

The conventional fuel pressure regulator R is pre-set for nominal fuel pressure at the factory by installing a spring of predetermined strength. The regulator comes from the factory as a sealed unit, and no adjustments can be made on the unit to change the limited range of the fuel-to-air ratio set by the factory.

To obtain high performance, and increased horsepower, it would be desirable to alter or fine tune the factory setting of the fuel-to-air ratio.

There are several patents which disclose various regulating devices for engines.

Stokes, U.S. Pat. No. 2,374,844 discloses a regulating device for controlling the supply of fuel to internal combustion engines whereby fuel is metered through a valve in the shape of a hollow cylinder containing a roughly triangular port.

Wirth et al, U.S. Pat. No. 2,482,956 discloses a fuel supply system for varying the pressure of the fuel in the fuel line which utilizes a device for giving temporary enrichment to the fuel mixture when the throttle valve is opened, and a mechanism having a temperature responsive element for enriching the fuel-to-air mixture while the engine is cold.

Casey et al, U.S. Pat. No. 4,204,507 discloses a fuel injection valve wherein the control of fuel from the fuel bowl to the throat of the throttle body is controlled by a single fuel injector per throat, the fuel injected is pulsed in accordance with a preselected timing scheme by means of an electronic control unit.

The present invention is distinguished over the prior art in general, and these patents in particular by a manually adjustable override apparatus which is connected to an existing fuel pressure regulator to alter the fuel-to-air mixture fed to fuel injectors. A T-shaped member has a lower end adapted to be connected on the vacuum hose fitting of the regulator and has an outwardly extending hose fitting. A headed plunger slidably contained in the longitudinal bore of the T-shaped member has an elongate lower end extending outwardly from the bottom of the T-shaped member and through the hose fitting of the regulator to engage the top of the diaphragm in the regulator. Vacuum communicates around the plunger between the interior of the T-shaped member and the vacuum chamber of the regulator. An adjustment screw in the top end of the T-shaped member engages a small piston slidably and sealably contained in the longitudinal bore. A compression spring is biased between the piston and the head of the plunger.

The existing vacuum hose is removed from the regulator and the override device is installed on the existing regulator. The vacuum hose is re-installed on the hose fitting of the override device. When the adjustment screw is backed off, the diaphragm operates under pressure of the existing factory installed spring in the conventional manner, and when the adjustment screw is screwed in, the plunger is resiliently pressed against the diaphragm under the increased spring pressure of the secondary override spring to increase the pressure on the diaphragm and vary the fuel pressure resulting in a variable fuel-to-air ratio.

SUMMARY OF THE INVENTION

It is therefore an object of the present invention to provide a manually adjustable override apparatus for the fuel pressure regulator of fuel injection engines.

It is another object of this invention to provide a manually adjustable override apparatus which is easily and quickly installed on the existing fuel pressure regulator of fuel injection engines without the need for special tools or equipment.

Another object of this invention is to provide a manually adjustable override apparatus which will allow a selective fuel-to air mixture to be fed to the fuel injectors of fuel injection engines without extensive modification of the existing fuel injection system.

A further object of this invention is to provide a manually adjustable override apparatus which will allow the horsepower of a fuel injection engine to increased without modification to the engine.

A still further object of this invention is to provide a manually adjustable override apparatus which is simple in construction, economical to manufacture, and rugged and reliable in use.

Other objects of the invention will become apparent from time to time throughout the specification and claims as hereinafter related.

The above noted objects and other objects of the invention are accomplished by a manually adjustable override apparatus which is connected to an existing fuel pressure regulator to alter the fuel-to-air mixture fed to fuel injectors. A T-shaped member has a lower end adapted to be connected on the vacuum hose fitting of the regulator and has an outwardly extending hose fitting. A headed plunger slidably contained in the longitudinal bore of the T-shaped member has an elongate lower end extending outwardly from the bottom of the T-shaped member and through the hose fitting of the regulator to engage the top of the diaphragm in the regulator. Vacuum communicates around the plunger between the interior of the T-shaped member and the vacuum chamber of the regulator. An adjustment screw in the top end of the T-shaped member engages a small piston slidably and sealably contained in the longitudinal bore. A compression spring is biased between the piston and the head of the plunger. The vacuum hose is removed from the regulator and the override device is installed on the existing regulator. The vacuum hose is re-installed on the hose fitting of the override device.

When the adjustment screw is backed off, the diaphragm operates under pressure of the existing factory installed spring in the conventional manner, and when the adjustment screw is screwed in, the plunger is resiliently pressed against the diaphragm under the increased spring pressure of the secondary override spring to increase the pressure on the diaphragm and vary the fuel pressure resulting in a variable fuel-to-air ratio.

BRIEF DESCRIPTION OF THE DRAWINGS

FIG. 1 is a view in longitudinal cross section of a conventional fuel pressure regulator of the prior art.

FIG. 2 is a view in longitudinal cross section of a manually adjustable override apparatus in accordance with the present invention installed on a conventional fuel pressure regulator.

DESCRIPTION OF THE PREFERRED EMBODIMENT

Referring to the drawings by numerals of reference, there is shown in FIG. 1, a conventional fuel pressure regulator R of the type provided on fuel injection engines. The fuel pressure regulator R is attached to the fuel supply manifold assembly downstream of the fuel injectors and regulates the fuel pressure supplied to the fuel injectors. The pressure regulator R is divided into two compartments by an internal diaphragm D. A fuel supply inlet FI at the bottom of the regulator is connected to the fuel supply and a tubing or hose fitting HF at the top of the regulator is connected by a vacuum hose H, to the intake manifold. A fuel filter FF is disposed in the regulator R between the fuel supply inlet FI and the underside of the diaphragm D.

The regulator R acts as a diaphragm-operated relief valve in which one side of the internal diaphragm D senses fuel pressure and the other side is subjected to intake manifold vacuum. The underside of the diaphragm D is provided with a valve member V which engages a valve seat member VS. Nominal fuel pressure is established by a spring S biased against the top side of the diaphragm D to apply a spring pre load to the diaphragm. Balancing one side of the diaphragm with manifold pressure maintains a constant fuel pressure drop across the injectors. Fuel in excess of that used by the engine, is bypassed through the regulator and returns to the fuel tank through conduit C connected to the valve seat VS.

Referring now to FIG. 2, the present invention comprises a T-shaped fitting 10 having an internal longitudinal main bore 11 extending from its upper end and terminating in a reduced diameter bore 12 near its lower end and a lateral threaded bore 13 extends through the side wall of the fitting 10 into the main bore 11. The exterior of the T-shaped fitting 10 has a reduced diameter portion 14 at its lower end which is substantially the same outside diameter as the hose fitting HF of the existing regulator R and the reduced diameter bore 12 is approximately the same diameter as the bore of the existing hose fitting HF.

The main bore 11 is counterbored 15 at its upper end and a tubular fitting 16 is received in the counter bore 15 at the top end of the T-shaped fitting 10. The tubular fitting 16 has a threaded bore 17 and has external threads 18. A screwdriver slot 19 is provided in the top of the fitting 16 to facilitate installation as explained hereinafter.

A hose fitting 20 is secured in the lateral threaded bore 13 and its outer end receives the existing vacuum hose H. The reduced diameter bottom end 14 of the T-shaped fitting 10 is joined to the hose fitting HF of the existing regulator R by a short length of rubber hose 21 which surrounds and seals the juncture.

An elongate headed rod or plunger 22 is slidably received in the bores 11 and 12 with annular clearance sufficient to allow vacuum to communicate between the T-shaped fitting 10 and the existing regulator chamber and thus to operate the regulator diaphragm D. The shaft 22A of the plunger extends outwardly from the bottom of the T-shaped fitting 10.

A small piston 23 is slidably received in the top of the bore 11 and has an annular O-ring seal 24 which forms a reciprocating seal with the bore 11. A compression spring 25 is biased between the bottom of the piston 23 and the head 22B of the plunger 22. An adjustment screw 26 is threadedly received in the threaded bore 17 of fitting 16 and provided with a lock nut 27 to prevent the screw from working loose after the proper adjustment has been made.

An inverted generally U-shaped bent metal bracket 28 is secured to the top portion of the fuel regulator R. The lower ends 29 of the bracket 28 are bent inwardly to be received beneath the flange F of the regulator R. The externally threaded portion 18 of the fitting 16 is threadedly received through a threaded aperture 30 in the top portion of the bracket 28 and its lower end is received in the counter bore 15 at the top end of the T-shaped fitting 10. The fitting 16 is secured by a nut 31. A screwdriver may be inserted into the slot 19 to prevent the fitting 16 from turning when installing the nut 31. When properly positioned, the laterally extending hose fitting 20 is facing in the general direction of the existing hose fitting on the engine manifold such that the existing vacuum hose H can be connected to the hose fitting 20, or alternatively the apparatus may be provided with a pre-connected vacuum hose of sufficient length to be connected to at its outer end to the existing manifold fitting.

A pair of screws 32 are received through threaded holes 33 in the mid portion of the bracket 28 and positioned such that their bottoms are approximately ¼" from the lower ends 29 of the bracket. A nut 34 is installed on each screw 32 and positioned approximately ¼" from the bottom. The bracket 28 is slid onto the regulator R, and the screws 32 are tightened onto the regulator flange F. The nuts 34 at the lower ends of the screws 32 are engaged between the inner surface of the bracket 28 and the outside diameter of the regulator R. Since most regulator flanges are rounded and narrow, the nuts 34 at the lower end of the screws serve as a guide in positioning and maintaining the bottom of the screws on the flange.

The existing vacuum hose H is removed from the regulator R and the bracket 28 is slid onto the regulator R with the lower end of the plunger 22 being fed through the hose fitting HF at the top of the regulator and the short length of hose 21 being connected onto the hose fitting HF. The screws 32 are tightened to secure the bracket 28 in place. The vacuum hose H is then installed onto the hose fitting 20 of the override device When the adjustment screw 26 is backed off, the diaphragm D is controlled by the vacuum to operate normally under pressure of the existing factory installed spring S in the conventional manner. The annular clearance between the plunger 22 and the bores 11 and 12 allow vacuum to communicate between the T-shaped fitting 10 and the existing regulator chamber and thus to operate the regulator diaphragm D.

When the adjustment screw 26 is screwed in, the piston 23 is pushed downward and the plunger 22 is resiliently pressed against the diaphragm D under the spring pressure of the secondary spring 25. Thus, the amount of pressure required to move the diaphragm is increased which results in a change in the fuel-to-air ratio.

OPERATION

After the vacuum hose H is installed onto the hose fitting 20 of the override device, the engine may be connected to a conventional pressure gage to visually determine desired settings, or may be done by a skilled mechanic without the aid of electronic tuning apparatus. The engine is then started and allowed to run.

The adjustment screw 26 is backed off allowing the diaphragm D to be controlled by the vacuum to operate normally under pressure of the existing factory installed spring S in the conventional manner. The annular clearance between the plunger 22 and the bores 11 and 12 allows vacuum to communicate between the T-shaped fitting 10 and the existing regulator chamber and thus to operate the regulator diaphragm D. A reading of the factory pressure setting is then taken.

The adjustment screw 26 is then screwed in until the desired pressure is attained on the pressure gage. When the adjustment screw 26 is screwed in, the piston 23 is pushed downward and the plunger 22 is resiliently pressed against the diaphragm D under the spring pressure of the secondary spring 25. Thus, the amount of pressure required to move the diaphragm is increased which results in a change in the fuel-to-air ratio. This will be the "high speed" pressure setting.

After the desired ratio has been achieved, the lock nut 27 is tightened onto the top of the fitting 16 to secure the adjustment screw 26 at the proper setting and prevent the screw from working loose after the proper adjustment has been made.

While this invention has been described fully and completely with special emphasis upon a preferred embodiment, it should be understood that within the scope of the appended claims the invention may be practiced otherwise than as specifically described herein.

I claim:

1. A manually adjustable override apparatus for connection to the vacuum hose fitting of an existing fuel pressure regulator of the type containing a diaphragm to selectively alter the fuel-to-air ratio fed to fuel injectors, the apparatus comprising;
    a fitting adapted to be installed in fluid communication between the vacuum chamber of the fuel pressure regulator and the existing vacuum manifold,
    plunger means slidably mounted in said fitting and having one end extending outwardly therefrom to engage the diaphragm of the existing fuel pressure regulator, and
    manual adjustment means on said fitting including resilient means operatively connected to said plunger means for applying a selective resilient force on the diaphragm of the existing fuel pressure regulator, such that
    upon decreasing the force applied by said plunger means the diaphragm will operate to provide the factory set fuel-to-air mixture, and upon increasing the force applied by said plunger means the diaphragm will operate under an increased resilient force in excess of the factory set condition whereby the factory set fuel-to-air ratio may be selectively altered.

2. A manually adjustable override apparatus according to claim 1 including
    a bracket adapted to be connected to said fitting and removably mounted on the existing fuel pressure regulator for removably securing said fitting thereon.

3. A manually adjustable override apparatus according to claim 1 in which;
    said fitting comprises a T-shaped member having a lower end adapted for connection to the vacuum hose fitting of the existing fuel pressure regulator, a laterally extending hose fitting adapted for connection to the existing vacuum manifold fitting, and a vacuum passageway between said lower end and said hose fitting,
    said manual adjustment means is connected at the top end of said T-shaped member, and
    said resilient means is contained within said T-shaped member and operatively connected between said manual adjustment means and said plunger means.

4. A manually adjustable override apparatus according to claim 3 in which
    said manual adjustment means comprises an adjustment screw threadedly received in the top end of said T-shaped member.

5. A manually adjustable override apparatus according to claim 3 in which
    said plunger means has an upper end slidably contained within said T-shaped member and a lower portion extending outwardly from the lower end thereof to be slidably received through the existing vacuum hose fitting of the regulator and operatively engaged with the diaphragm of the existing fuel pressure regulator.

6. A manually adjustable override apparatus according to claim 5 in which
    said resilient means comprises a compression spring disposed between said manual adjustment means and the upper end of said plunger means.

7. A manually adjustable override apparatus according to claim 6 including
    a piston member slidably disposed in said T-shaped member between said manual adjustment means and said compression spring.

8. A manually adjustable override apparatus according to claim 1 in which;
    said fitting comprises a T-shaped member having a lower end for connection to the vacuum hose fitting of the existing fuel pressure regulator, a laterally extending hose fitting adapted for connection to the existing vacuum manifold fitting, and a vacuum passageway between said lower end and said hose fitting,
    an adjustment screw threadedly received in the top end of said T-shaped member,
    a plunger member having an upper end slidably contained within said T-shaped member and a lower portion extending outwardly from the lower end thereof to be slidably received through the existing vacuum hose fitting of the regulator and operatively engaged with the diaphragm of the existing fuel pressure regulator, a piston member slidably disposed in said T-shaped member below said adjustment screw, and a compression spring disposed between the bottom end of said piston member and the upper end of said plunger member.

9. A manually adjustable override apparatus according to claim 8 in which;

said adjustment screw is threadedly received in the top portion of said T-shaped member and provided with a lock nut to prevent said screw from working loose after the proper adjustment has been made.

10. A manually adjustable override apparatus according to claim 8 in which;

said T-shaped member has an internal longitudinal main bore extending from its upper end and terminating in a reduced diameter bore near its lower end, and said laterally extending hose fitting having a bore extending into said main bore.

11. A manually adjustable override apparatus according to claim 10 in which;

said piston member is slidably received in the upper portion of said T-shaped member main bore and has a circumferential seal forming a reciprocating sealing relation with said main bore.

12. A manually adjustable override apparatus according to claim 10 in which;

said T-shaped member lower end is substantially the same outside diameter as the hose fitting of the existing fuel pressure regulator and said reduced diameter bore is approximately same diameter as the bore of the hose fitting of the existing fuel pressure regulator.

13. A manually adjustable override apparatus according to claim 12 in which;

said T-shaped member lower end is connected to the hose fitting of the existing fuel pressure regulator by a length of conduit.

14. A manually adjustable override apparatus according to claim 12 in which;

said plunger member has a head portion slidably received in said T-shaped member main bore and a reduced diameter shaft portion extending through said T-shaped member reduced diameter bore with annular clearance sufficient to allow vacuum to communicate between said T-shaped member vacuum passageway and the vacuum chamber of the existing fuel pressure regulator, and the bottom end of said shaft portion is engaged on the diaphragm of the existing fuel pressure regulator to move therewith.

15. A manually adjustable override apparatus according to claim 14 wherein;

when said adjustment screw is backed outwardly the existing diaphragm is controlled by the vacuum to operate normally under pressure of a factory installed spring in the existing fuel pressure regulator in the conventional manner, and when said adjustment screw is screwed inwardly, said piston is pushed downward and said plunger shaft is resiliently pressed against the diaphragm under the spring pressure of said compression spring to increase the amount of pressure required to move the diaphragm with a resultant change in the fuel-to-air ratio.

16. A method of manually overriding an existing fuel pressure regulator of the type having a vacuum hose fitting and containing a diaphragm to selectively alter the fuel-to-air mixture fed fuel injectors, comprising the steps of;

providing an override fitting having one end adapted for connection to the vacuum hose fitting of the existing fuel pressure regulator, a laterally extending hose fitting adapted for connection to the existing vacuum manifold fitting, a vacuum passageway between said lower end and said hose fitting, manual adjustment means at another end of said fitting, plunger means slidably mounted in said fitting and having one end extending outwardly therefrom to engage the diaphragm of the existing fuel pressure regulator, and resilient means contained within said fitting and operatively connected between said manual adjustment means and said plunger means, removing the vacuum hose from the existing fuel pressure regulator, connecting said override fitting onto the hose fitting of the regulator such that the lower end of said plunger means extends through the interior of the regulator hose fitting and engages the diaphragm of the regulator, connecting the vacuum hose to the hose fitting of said override fitting, adjusting said manual adjustment means to apply a selective resilient force on the diaphragm of the existing fuel pressure regulator, such that upon decreasing the force applied by said plunger means the diaphragm will operate to provide the factory set fuel-to-air mixture, and upon increasing the force applied by said plunger means the diaphragm will operate under an increased resilient force in excess of the factory set condition whereby the factory set fuel-to-air ratio may be selectively altered.

* * * * *